(12) United States Patent
Guerret et al.

(10) Patent No.: US 8,461,098 B2
(45) Date of Patent: *Jun. 11, 2013

(54) METHOD FOR FORMULATING ACTIVE FRAGRANCE INGREDIENTS IN ORDER TO PROTECT THEM AND INCREASE THEIR REMANENCE

(75) Inventors: Olivier Guerret, La Tour de Salvagny (FR); Jean-Marc Suau, Lucenay (FR); Yves Kensicher, Theize (FR)

(73) Assignee: Coatex S.A.S., Genay (FR)

( * ) Notice: Subject to any disclaimer, the term of this patent is extended or adjusted under 35 U.S.C. 154(b) by 381 days.

This patent is subject to a terminal disclaimer.

(21) Appl. No.: 12/600,482

(22) PCT Filed: May 20, 2008

(86) PCT No.: PCT/IB2008/001275
§ 371 (c)(1),
(2), (4) Date: Nov. 17, 2009

(87) PCT Pub. No.: WO2008/146119
PCT Pub. Date: Dec. 4, 2008

(65) Prior Publication Data
US 2010/0152094 A1    Jun. 17, 2010

(30) Foreign Application Priority Data
Jun. 1, 2007   (FR) .................................... 07 03890

(51) Int. Cl.
*C11D 3/50*   (2006.01)
(52) U.S. Cl.
USPC ............... 512/4; 512/2; 510/101; 514/772.6; 426/602; 426/609
(58) Field of Classification Search
USPC ........ 512/2, 4; 510/101; 514/772.6; 426/602, 426/609
See application file for complete search history.

(56) References Cited

U.S. PATENT DOCUMENTS

| | | | |
|---|---|---|---|
| 6,375,983 B1 | 4/2002 | Kantor et al. | |
| 6,433,061 B1 * | 8/2002 | Marchant et al. | 524/460 |
| 7,737,103 B2 * | 6/2010 | Hloucha et al. | 510/293 |
| 8,354,466 B2 * | 1/2013 | Guerret et al. | 524/500 |
| 2001/0033826 A1 * | 10/2001 | Roulier et al. | 424/43 |
| 2002/0102286 A1 | 8/2002 | Kantor et al. | |
| 2003/0164476 A1 * | 9/2003 | Guo et al. | 252/384 |
| 2004/0110891 A1 * | 6/2004 | Guo et al. | 524/522 |
| 2005/0002876 A1 * | 1/2005 | Yukl et al. | 424/54 |
| 2005/0227906 A1 * | 10/2005 | Schudel et al. | 512/2 |
| 2006/0193789 A1 * | 8/2006 | Tamarkin et al. | 424/47 |
| 2007/0092067 A1 * | 4/2007 | Fujisawa | 378/196 |
| 2007/0224153 A1 * | 9/2007 | LiBrizzi et al. | 424/74 |
| 2008/0072785 A1 * | 3/2008 | Suau et al. | 106/31.9 |
| 2009/0088519 A1 * | 4/2009 | O'Brien Stickney et al. | 524/556 |
| 2010/0113617 A1 * | 5/2010 | Guerret et al. | 514/772.6 |
| 2010/0184897 A1 * | 7/2010 | Dupont et al. | 524/315 |
| 2010/0203170 A1 * | 8/2010 | Guerret et al. | 424/694 |
| 2010/0267564 A1 * | 10/2010 | Moro et al. | 504/320 |
| 2011/0319500 A1 * | 12/2011 | Suau | 514/772.6 |

FOREIGN PATENT DOCUMENTS

| | | |
|---|---|---|
| EP | 1 655 351 | 5/2006 |
| FR | 2 839 658 | 11/2003 |
| JP | 2004-2672 A | 1/2004 |
| JP | 2005 298474 | 10/2005 |
| JP | 2005-530524 A | 10/2005 |
| JP | 2007-92067 A | 4/2007 |

OTHER PUBLICATIONS

Office Action issued Dec. 11, 2012 in Japanese Patent Application No. 2010-509906 (English-language translation only).

* cited by examiner

*Primary Examiner* — Douglas McGinty
(74) *Attorney, Agent, or Firm* — Oblon, Spivak, McClelland, Maier & Neustadt, L.L.P.

(57) ABSTRACT

The invention pertains to a new method for formulating active fragrance ingredients in such a way as to protect them and to slow the evaporation method of said active ingredients. It relies upon the use of thickening acrylic emulsions, at a pH above 5 and containing hydrophobic groups in order to trap said active ingredients. The invention also pertains to various methods of realizing the active ingredients thus formulated: a mixture in water of these active ingredients with thickening emulsions, dispersion of solid particles of these polymers and of these active ingredients after acidification, and solid particles obtained in a dry state after water is eliminated. Finally, the invention pertains to the use of these various formulations in order to protect an active ingredient and slow its evaporation kinetic.

13 Claims, No Drawings

METHOD FOR FORMULATING ACTIVE FRAGRANCE INGREDIENTS IN ORDER TO PROTECT THEM AND INCREASE THEIR REMANENCE

This application is a 371 of PCT/IB08/01275 filed May 20, 2008. Priority to French application 07 03890, filed Jun. 1, 2007, is claimed.

SUMMARY OF THE INVENTION

The invention pertains to a new method of formulating active fragrance ingredients in order to protect them when applied to the skin or some other support, such as a textile (e.g. in the case of a laundry powder) or a wall (e.g. in the case of paint), and in order to control the progressive release of said active ingredients after their application. It relies upon the use of water-soluble acrylic emulsions, at a pH above 5, containing hydrophobic groups. These emulsions allow the active fragrance ingredients to be trapped by encapsulation in order to promote their protection against the environment, while slowing their release kinetics, which translates into the perfume's increased effectiveness (remanence phenomenon).

BACKGROUND DEFINITIONS

Active fragrance ingredient: in the context of this invention, this term designates any substance that has a detectable olfactory activity. For simplicity's sake, the Application may use the shortened expression "active ingredient" to refer to the "active fragrance ingredient".
Perfume: in the context of this invention, this term designates any formulation that contains at least one active fragrance ingredient.
HASE: Anglo-Saxon acronym for Hydrophobically Alkali Swellable Emulsion. This term designates acrylic thickening agents based on (meth)acrylic acid, on an ester of these acids and on a hydrophobic monomer.

TECHNICAL PROBLEM AND PRIOR ART

The modes of administering perfumes are varied. However, improving their performance at the level of initial perfume formulation as well as at the level of the surface to which it is applied is a considerable constraint for the person skilled in the art. Active fragrance ingredients contained in perfume formulations can prove to be chemically unstable and vulnerable to external stresses (such as oxidations).

In addition, improving the remanence of perfumes, that is, to slow the evaporation of the active fragrance ingredients, is a significant challenge on several grounds. At a toxicological level, these molecules, when diffused in great quantity, can cause harmful effects on human beings (linalool can provoke gait ataxia, and ambrette musk can cause neurological damage). From an economic point of view, these organic compositions are volatile and generally very costly. From a marketing point of view, the consumer will search for a prolonged fragrance effect developed by the perfume purchased. Thus, technically speaking, it is very important to have a means that allows protection and gradual release of a large number of different chemical structures, since a perfume can contain more than 100 active fragrance ingredients.

Lastly, it is important to protect an active ingredient while increasing its remanence, both in a liquid perfume formulation (such as an eau de toilette) and in a solid-form perfume formulation (such as perfumed paint film that gradually releases an odor). Consequently, the technical problem posed by the present Application can be summed up as the possibility of providing an active fragrance ingredient protected from external stresses, whose remanence is enhanced whether in solid or liquid form.

For several years, we have attempted to encapsulate active fragrance ingredients in such a way as to protect them while improving their remanence. Presently, three encapsulation techniques are known: implementation of β-cyclodextrins, use of silicone emulsions and encapsulation using organic polymers.

The first category uses β-cyclodextrins, which are natural host molecules obtained by the enzymatic degradation of starch. They appear in the form of cyclic oligomers of glucose and are characterized by the presence of a cavity that allows acceptance of a host molecule in such a way as to form an inclusion complex: according to this mechanism they can encapsulate the active fragrance ingredients as described in particular in document EP 0 392 606. However, complexes based on β-cyclodextrins and on an active ingredient must undergo a supplementary coating stage starting with a protective material (wax or fatty alcohol) in such a way as to constitute a barrier that allows gradual release of the active ingredient. In addition, the stability of the inclusion complex formed depends above all on the β-cyclodextrin's affinity with the ingredient to be encapsulated: many ingredients cannot be encapsulated by β-cyclodextrins.

A second method consists in encapsulating an active fragrance ingredient using silicone emulsions in water, which is described in document U.S. Pat. No. 5,130,171. Silicones' higher gas permeability allows them to release the active ingredients' molecules slowly. However, such a method rests on the solubility or compatibility of the active ingredient for encapsulation with the silicone emulsion used, which therefore does not allow the encapsulation of all active fragrance ingredients.

Finally, there exists a third category of encapsulation methods based on the implementation of organic polymers. Among them, one distinguishes coacervation methods: they are based on coating an emulsion of active ingredients with a precipitate polymer film using a colloidal solution of that polymer, this solution being destabilized.

This precipitate, called coacervate, will be adsorbed onto the droplets of the emulsion of the active ingredients to be coated. Thus, document FR 2 727 632 describes microcapsules of a non-rigid envelope, obtained by coacervation of gelatin and of a copolymer of the gum Arabic type, in a liquid or solid gel and whose contents are an aromatic mix prepared for the purpose of perfuming. In parallel, document U.S. Pat. No. 5,126,061 describes perfume microcapsules prepared by coacervation between the gelatin and other polyionic material.

However, coacervation methods require realization beforehand of an emulsion of active ingredients for encapsulation, which constitutes a stage additional to coacervation. In addition, this technique does not allow encapsulation of water-soluble active ingredients, because they cannot be put into emulsion. Furthermore, this method rests on the compatibility of the active ingredients with the polymers used for coacervation.

Another encapsulation method based on polymer implementation is polycondensation. This method is based on polycondensation of two monomers, one compatible with the encapsulation environment, and the other with the substance to be encapsulated. Thus document WO 2007/004166 describes polyurethane capsules containing an active ingredient; these capsules being obtained through a reaction between a polyisocyanate compound and a guanidine salt with diols. However, this method is limited to active ingredients that do not chemically react to isocyanates: alcohols, amines or acids can therefore not be encapsulated.

Another method of encapsulation based on polymers is the method of forming a film in the presence of surface active agents. This method is based on the choice of a polymer compatible with the active ingredient to be encapsulated. An emulsion of the said polymer is realized in an aqueous environment in the presence of the active ingredient to be encapsulated and of surface active agents. To this end, document U.S. Pat. No. 4,803,195 describes the implementation of cellulosic polymers or polyvinyl alcohol, while document WO 2005/032503 deals with the use of acrylic polymers. These procedures pose the inconvenience of implementing additional compounds, which are surface active agents.

In order to resolve the problem of encapsulating an active fragrance ingredient to protect it effectively, improve its remanence, allow obtaining of a liquid or solid form, and avoid the problems inherent in the solutions proposed by the art, the Applicant has arrived at an original production method characterized by the inclusion of the following stages:
- a) mixing at least one HASE emulsion, at least one active fragrance ingredient, and water, said mixture having a pH greater than 5, preferentially 6, and very preferentially 7,
- b) potentially precipitating the mixture obtained after stage a) by adjusting the pH to a value less than 5, preferentially 3, in order to achieve dispersion of solid particles in water,
- c) potentially isolate the solid particles obtained after stage b) by eliminating the water.

One of the original aspects of the method according to the invention is to use HASE type emulsions, which have an associative hydrophobic monomer. This monomer possesses the property, when the emulsion is neutralized at a high enough pH (>5), of creating associative interactions that reinforce the thickening effect in comparison with a polymer that has no such monomers. These associative interactions between hydrophobic groups delimit the domains, which amount to solvation cages for an active ingredient. One of the Applicant's merits is to have known how to identify and use the phenomenon of water structure via an HASE type emulsion at a pH higher than 5: it thus naturally protects the active ingredients dissolved in that solution.

Such a use of HASE type emulsions is, to our current knowledge, a new use of those objects widely described in painting applications (see documents FR 2 693 203, FR 2 872 815 and FR 2 633 930), or also in the concrete sector (see the French patent application, not yet published, under the filing number FR 07 00086). Furthermore, these technical fields are very far from the one pertaining to the present invention, and the aforementioned documents give no disclosures or instructions which could guide the person skilled in the art towards the present invention.

Consequently, after realizing stage a) of the method according to the invention, one obtains a mixture in which the active ingredient's molecules are trapped in the solvation cages. Even after application and drying of the resulting formulation on a support (skin, fabric, wall, etc.) the active ingredients remain trapped within the polymer film formed during drying: thus it slows the evaporation speed of the active ingredient by diffusion through the film.

In a first variant of the method of the invention, one can also implement a stage b) of acidification of the mixture obtained after stage a). This reduction in pH triggers a collapse of the polymer structure: one thus achieves dispersion in water of solid particles consisting of the polymer and the active ingredients. The active ingredients remain trapped: they are still protected and their evaporation speed is reduced.

In a second variation, one can simultaneously implement stage b) but also a consecutive stage c), which consists of isolating the solid particles obtained after stage b), by eliminating the water. As in the previous case, the active ingredients are isolated and therefore protected while evaporating more slowly.

Also, another advantage of the method according to this invention is to deliver an active fragrance ingredient in a form that protects and slows its release; this could be in three forms:
- a liquid that is an aqueous solution, when the product is prepared realizing only the mixing stage of the method according to the invention at a pH higher than 5,
- a liquid that is a dispersion of solid particles in water, when the preparation of the product also implements the precipitation stage at a pH lower than 5,
- a solid consisting of solid particles of the active ingredient which are trapped in the polymer particles, when the isolation stage according to the invention is implemented.

The Applicant indicates that the invention's unity is ensured particularly among the three forms of the invention's realization through implementation of all the forms of the combination:
- of at least one copolymer of (meth)acrylic acid, of an ester monomer of these acids, and a hydrophobic monomer,
- and of at least one active fragrance ingredient.

Finally, another advantage of the invention is that it can be implemented to trap a very large number of active fragrance ingredients. Essentially, the person skilled in the art has access to a very large library of associative monomers which he can draw from to identify the monomer that shows the best possible affinity with the active ingredient to be trapped.

DESCRIPTION OF THE INVENTION

A primary object of the invention is a method for manufacturing a formulation containing at least one active fragrance ingredient, and characterized by the fact that it comprises the steps of:
- a) mixing at least one HASE emulsion, at least one active fragrance ingredient, and water, said mixture having a pH greater than 5, preferentially 6, and very preferentially 7,
- b) potentially precipitating the mixture obtained after stage a) by adjusting the pH to a value less than 5, preferentially 3, in order to achieve dispersion of solid particles in water,
- c) potentially isolating the solid particles obtained after stage b) by eliminating the water.

In a first variant, the method according to the invention only implements stage a).

In a second variant, the method according to the invention implements stage a) and then stage b).

In a third variant, the method according to the invention implements stage a) and then stage b), then stage c).

The method according to the invention is further characterized in that the pH of the mixture, during step a), is adjusted by means of an organic or mineral base. In practice, the components (the active ingredient, water, HASE emulsion, and the mineral or organic base) are added during agitation in a reactor; the order in which they are added will be chosen by the person skilled in the art, particularly based on the water-solubility of the active ingredient to be encapsulated.

The method according to the invention is further characterized by obtaining during stage a), 0.1% to 20%, preferentially 0.1% to 10%, and very preferentially 0.1% to 5% by dry weight of a HASE emulsion, in relation to the total weight of the aqueous formulation after step a) is implemented.

The method according to the invention is further characterized by obtaining during stage a), 0.1% to 20% by dry weight of a hydrophobic or hydrophilic active fragrance ingredient, in relation to the total weight of the aqueous formulation after step a) is implemented.

The method according to the invention is also characterized by the fact that a moderately strong or strong acid is used in the course of stage b).

The method according to the invention is also characterized by the fact that the HASE type emulsion contains at least one copolymer of (meth)acrylic acid, of a non water-soluble monomer that is preferentially a (meth)acrylic ester very preferentially chosen among ethyl acrylate, butyl acrylate, methyl methacrylate and mixtures thereof, and of a monomer containing at least one hydrophobic group.

The method according to the invention is also characterized by the fact that the said monomer containing at least one hydrophobic group has the general formula:

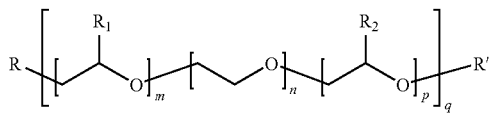

where:
- m, n, p and q are integers and m, n, p are less than 150,
- R has a polymerizable vinylic function,
- $R_1$ and $R_2$ are identical or different, and represent hydrogen atoms or alkyl groups,
- R' is a hydrophobic group comprising at least 6, preferentially at least 10, and very preferentially at least 12, carbon atoms.

Finally, the method according to the invention is characterized by the fact that the water is eliminated by evaporation or centrifugation during stage c). However, the person skilled in the art will be able to implement any other technique intended to eliminate the water from the mixture obtained after stage b).

Another object of the invention is constituted by the aqueous formulation containing at least one active fragrance ingredient, and obtained by implementing stage a) of the method described above.

This aqueous formulation containing at least one active fragrance ingredient is characterized:
1. in that it contains water, at least one HASE emulsion and at least one active fragrance ingredient,
2. and in that it has a pH greater than 5, preferentially 6, and very preferentially 7.

This aqueous formulation is further characterized in that it contains 0.1% to 20%, preferentially 0.1% to 10%, and very preferentially 0.1% to 5% by dry weight of at least one HASE emulsion, in relation to its total weight.

This aqueous formulation is further characterized in that it contains 0.1% to 20%, by dry weight, of at least one hydrophilic or hydrophobic active fragrance ingredient, in relation to its total weight.

This aqueous formulation is further characterized in that the HASE emulsion contains at least one copolymer of (meth) acrylic acid, a non-hydrosoluble monomer which is preferentially a (meth)acrylic ester chosen very preferentially from among ethyl acrylate, butyl acrylate, methyl methacrylate and mixtures thereof, and a monomer containing at least one hydrophobic group.

This aqueous formulation is further characterized in that said monomer containing at least one hydrophobic group has the general formula:

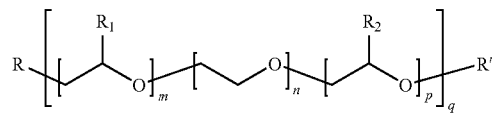

where:
- m, n, p and q are integers and m, n, p are less than 150,
- R has a polymerizable vinylic function,
- $R_1$ and $R_2$ are identical or different, and represent hydrogen atoms or alkyl groups,
- R' is a hydrophobic group comprising at least 6, preferentially at least 10, and very preferentially at least 12, carbon atoms.

Another object of the invention resides in the formulation made up of solid particles dispersed in water, and obtained by implementing the precipitation stage b) of the method described above.

This dispersion of solid particles in water is characterized in that the solid particles that make it up contain at least one active fragrance ingredient and at least one copolymer of (meth)acrylic acid, of a non-hydrosoluble monomer which is preferentially a (meth)acrylic ester very preferentially chosen from among ethyl acrylate, butyl acrylate, methyl methacrylate and mixtures thereof, and of a monomer containing at least one hydrophobic group.

This dispersion of solid particles in water is further characterized in that said monomer containing at least one hydrophobic group has the general formula:

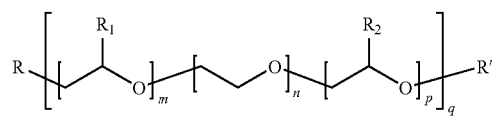

where:
- m, n, p and q are integers and m, n, p are less than 150,
- R has a polymerizable vinylic function,
- $R_1$ and $R_2$ are identical or different, and represent hydrogen atoms or alkyl groups,
- R' is a hydrophobic group comprising at least 6, preferentially at least 10, and very preferentially at least 12 carbon atoms.

Another object of the invention resides in the formulation made up of solid particles obtained by implementing the precipitation step c) of the method described above.

These solid particles are characterized in that they contain at least one active fragrance ingredient and at least one copolymer of (meth)acrylic acid, a non-hydrosoluble monomer which is preferentially a (meth)acrylic ester very preferentially chosen from among ethyl acrylate, butyl acrylate, methyl methacrylate and mixtures thereof, and a monomer containing at least one hydrophobic group.

This formulation is further characterized in that said monomer containing at least one hydrophobic group has the general formula:

$$R\left[\left[O\left[\begin{array}{c}R_1\\|\\\phantom{O}\end{array}\right]_m\right]\left[O\right]_n\left[\begin{array}{c}R_2\\|\\O\end{array}\right]_p\right]_q R'$$

where:
- m, n, p and q are integers and m, n, p are less than 150,
- R has a polymerizable vinylic function,
- $R_1$ and $R_2$ are identical or different, and represent hydrogen atoms or alkyl groups,
- R' is a hydrophobic group comprising at least 6, preferentially at least 10, and very preferentially at least 12 carbon atoms.

A final object of the invention is the use of the aqueous formulations of at least one active fragrance ingredient, the aqueous dispersions of solid particles of at least one active fragrance ingredient, and the solid particles of at least one active fragrance ingredient, as an agent with the dual function of protecting an active fragrance ingredient and slowing its evaporation.

EXAMPLES

Example 1

This example illustrates the method of the invention in which according to stage a) an aqueous formulation of an active fragrance ingredient and an HASE emulsion are realized at a pH higher than 5.

It also illustrates implementation of stage b) of the invention's method, which consists of reducing the pH to a value lower than 5.

It also illustrates implementation of stage c) of the invention, which isolates the solid particles of the encapsulated active ingredient.

Therefore this example also illustrates the three manners of completing the formulation according to the invention: a solution obtained after stage a), a dispersion of solid particles in water obtained after step b), and dry solid particles obtained after step c).

Completing Stage a).

In the case of tests No. 1 through 5, which are controls, one introduces into the water a certain mass of active fragrance ingredient, the mass of water implemented as the formulation achieved weighs 100 grams. The active ingredients tested are menthol, honeysuckle and Cananga oil.

In the case of tests No. 1 bis through 5 bis, which illustrate the invention, the same mass of active ingredient is introduced to the water as in tests No. 1 through 5, respectively. In addition, a certain amount of polymer is introduced, which is an HASE emulsion commercialized by the COATEX™ company under the name Rheo™ 2000, as well as some soda (50% solution) in order to obtain a pH equaling 5.5.

For each of these tests, Nos. 1 through 5 and 1 bis through 5 bis, the composition of the various formulas (in grams) is indicated in table 1.

TABLE 1

| Test No. | polymer | active ingredient | mass polymer | water mass | mass active ingredient | mass sodium hydroxide |
|---|---|---|---|---|---|---|
| 1 | — | menthol | 0 | 99.925 | 0.075 | 0 |
| 1 bis | Rheo ™ 2000 | menthol | 3.33 | 96.27 | 0.075 | 0.325 |
| 2 | — | menthol | 0 | 99.925 | 0.075 | 0 |
| 2 bis | Rheo ™ 2000 | menthol | 13.26 | 86.34 | 0.075 | 0.325 |
| 3 | — | honeysuckle | 0 | 98.3 | 1.7 | 0 |
| 3 bis | Rheo ™ 2000 | honeysuckle | 16.67 | 81.13 | 1.7 | 0.50 |
| 4 | — | honeysuckle | 0 | 99.9 | 0.1 | 0 |
| 4 bis | Rheo ™ 2000 | honeysuckle | 3.33 | 96.27 | 0.1 | 0.30 |
| 5 | — | Cananga oil | 0 | 99.9 | 0.1 | 0 |
| 5 bis | Rheo ™ 2000 | Cananga oil | 3.33 | 96.27 | 0.1 | 0.30 |

All of the formulations realized according to tests No. 1 through 4 display droplets that are perfectly visible to the naked eye: the active ingredient is dispersed in water.

In contrast, for all of tests No. 1 bis to 4 bis, one observes clear solutions: the molecules of the active fragrance ingredient have been solvated by the polymer and are perfectly dispersed in the continuous phase.

Completing Stage b).

For each of tests No. 1 ter to 5 ter, the pH of each solution respectively corresponding to tests No. 1 bis through 5 bis is decreased to a value equal to 2.5 by adding phosphoric acid.

This reduction in pH triggers collapse of the polymer structure: one thus achieves dispersion in water of solid particles consisting of the polymer and the active ingredients.

Using a measurement method based on light diffusion well known to the person skilled in the art, the size of the solid particles is determined.

Their diameter is equal to:
- 280 nm in the case of tests No. 1 ter and 2 ter;
- 1,000 nm in the case of tests No. 3 ter and 4 ter;
- 700 nm in the case of test No. 5 ter.

Completing Stage c).

Each dispersion resulting from tests No. 1 ter through 5 ter is placed in an oven at a temperature of 110° C., for a period long enough for 99.5% of the initial water weight to be evaporated.

In this way, solid particles are obtained that contain the active fragrance ingredients tested and that verify that they do not allow diffusion of any detectable odor at the level of the sense of smell.

Example 2

This example illustrates the method of the invention in which according to stage a) is realized an aqueous formulation from an active fragrance ingredient and from an HASE type emulsion with a pH higher than 5.

It also illustrates implementation of stage b) of the invention's method, which consists of reducing the pH to a value lower than 5.

Therefore this example also illustrates the two manners of completing the formulation according to the invention: a solution obtained after stage a), a dispersion of solid particles in water obtained after step b).

Completing Stage a).

In the case of tests No. 6 through 8, which are controls, one introduces into the water a certain mass of active fragrance ingredient, the mass of water implemented being 100 grams. The active ingredient tested is citronellal.

In the case of tests No. 6 bis through 8 bis, which illustrate the invention, the same mass of active ingredient is introduced to the water as in tests No. 6 through 8, respectively. In addition, a certain amount of polymer is introduced, which is an HASE emulsion commercialized by the COATEX™ company under the name Rheo™ 3800, as well as some soda (50% solution) in order to obtain a pH equaling 6.

For each of these tests, Nos. 6 through 8 and 6 bis through 8 bis, the composition of the various formulas (in grams) is indicated in table 2.

TABLE 2

| Test No. | polymer | active ingredient | mass polymer | water mass | mass active ingredient |
|---|---|---|---|---|---|
| 6 | — | citronellal | 0 | 99.925 | 27.74 |
| 7 | — | citronellal | 0 | 100 | 17.46 |
| 8 | — | citronellal | 0 | 100 | 8.3 |
| 6 bis | Rheotech ™ 3800 | citronellal | 22 | 100 | 27.74 |
| 7 bis | Rheotech ™ 3800 | citronellal | 22 | 100 | 17.46 |
| 8 bis | Rheotech ™ 3800 | citronellal | 22 | 100 | 8.3 |

All of the formulations realized according to tests No. 6 through 8 display droplets that are perfectly visible to the naked eye: the active ingredient is dispersed in water.

In contrast, for all of tests No. 6 bis to 8 bis, one observes gels: the molecules of the active fragrance ingredient have been solvated by the polymer and are dispersed in the continuous phase.

Completing Stage b).

For each of tests No. 6 bis to 8 bis, the pH of each solution respectively corresponding to tests No. 1 bis through 3 bis is decreased to a value equal to 4.8 by adding phosphoric acid.

This reduction in pH triggers collapse of the polymer structure: one thus achieves dispersion in water of solid particles consisting of the polymer and the active ingredients.

Using a measurement method based on light diffusion well known to the person skilled in the art, the size of the solid particles are determined.

Their diameter is equal to:

1,800 nm for 6 bis, 650 nm for 7 bis and 520 nm for 8 bis.

Example 3

This example illustrates the method of the invention in which according to stage a) an aqueous formulation of an active fragrance ingredient and an HASE emulsion are realized at a pH higher than 5.

It also illustrates implementation of stage b) of the invention's method, which consists of reducing the pH to a value lower than 5.

It also illustrates implementation of stage c) of the invention, which isolates the solid particles of the encapsulated active ingredient.

Therefore this example also illustrates the three manners of completing the formulation according to the invention: a solution obtained after stage a), a dispersion of solid particles in water obtained after step b), and dry solid particles obtained after step c).

Completing Stage a).

In the case of test No. 9, which is a control, one introduces into the water a certain mass of active fragrance ingredient, the mass of water implemented being 100 grams. The active ingredient tested is aurantiol.

For test No. 9 bis, which illustrates the invention, the same mass of active ingredient is introduced into the water as in test No. 9. In addition, a certain amount of polymer is introduced, which is an HASE emulsion commercialized by the COATEX™ company under the name Rheotech™ 3800, as well as some soda (50% solution) in order to obtain a pH equaling 5.5.

For each of these tests, Nos. 9 and 9 bis, the composition of the various formulas (in grams) is indicated in table 3.

TABLE 3

| Test No. | polymer | active ingredient | mass polymer | water mass | mass active ingredient | mass sodium hydroxide |
|---|---|---|---|---|---|---|
| 9 | — | aurantiol | 0 | 30 | 0.3 | 0 |
| 9 bis | Rheotech ™ 3800 | aurantiol | 22 | 30 | 0.3 | 0.64 |

In the case of test No. 9, the aurantiol appears in the form of droplets that are not miscible with the water. In contrast, for test No. 9 bis, one observes a gel: the molecules of the active fragrance ingredient have been solvated by the polymer and are dispersed in the continuous phase.

Completing Stage b).

The pH of the solution corresponding to test No. 9 bis is decreased to a value equal to 2.45 by adding phosphoric acid.

This reduction in pH triggers collapse of the polymer structure: one thus achieves dispersion in water of solid particles consisting of the polymer and the active ingredients.

Using a measurement method based on light diffusion well known to the person skilled in the art, the size of the solid particles are determined.

Their diameter is equal to about 1,900 nm.

Completing Stage c).

The dispersion is placed in a vacuum oven at a temperature of 45° C., for a period long enough for 99.5% of the initial water weight to be evaporated.

In this way, solid particles are obtained that contain the active fragrance ingredients tested.

The invention claimed is:

1. A method for producing a formulation comprising solid particles containing at least one active fragrance ingredient, said method comprising:
   a) mixing at least one HASE emulsion, at least one active fragrance ingredient, and water, thereby providing a mixture having a pH greater than 5,
   b) precipitating the mixture obtained by adjusting the pH to a value less than 5 in order to achieve a dispersion of solid particles in water, and
   c) isolating the solid particles obtained by eliminating the water.

2. The method according to claim 1, wherein the mixture's pH during stage a) is adjusted by an organic or mineral base, and in which the components of the mixture are added during agitation in a reactor; the order in which they are added being based on the water-solubility of the ingredient to be encapsulated.

3. The method according to claim 1, wherein, during stage a), 0.1% to 20% by dry weight of an HASE emulsion, in relation to the total weight of the aqueous formulation obtained after stage a), is mixed.

4. The method according to claim 1, wherein during stage a), 0.1% to 20% by dry weight of a hydrophobic or hydrophilic active fragrance ingredient, in relation to the total weight of the aqueous formulation obtained after stage a), is mixed.

5. The method according to claim 1, wherein the pH is adjusted with a strong acid during stage b).

6. The method according to claim 1, wherein the HASE emulsion comprises at least one copolymer of (meth)acrylic acid, a non-hydrosoluble monomer selected from the group consisting of ethyl acrylate, butyl acrylate, methyl methacrylate and mixtures thereof, and a monomer comprising at least one hydrophobic group.

7. The method according to claim 6, wherein said monomer comprising at least one hydrophobic group has the general formula:

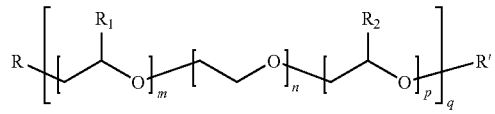

where:
   m, n, p and q are integers wherein m+n+p=less than 150,
   R is a polymerizable vinylic function,
   $R_1$ and $R_2$ are identical or different, and represent hydrogen atoms or alkyl groups, and
   R' is a hydrophobic group comprising at least 6 carbon atoms.

8. The method according to claim 1, wherein the water is eliminated by evaporation or centrifugation during stage c).

9. The method according to claim 1, wherein said mixture in a) has a pH greater than 6, and wherein the pH is adjusted to a value less than 3 in b).

10. The method according to claim 1, wherein said mixture in a) has a pH greater than 7, and wherein the pH is adjusted to a value less than 3 in b).

11. The method according to claim 1, wherein said mixture in a) has a pH greater than 6.

12. The method according to claim 1, wherein said mixture in a) has a pH greater than 7.

13. The method according to claim 1, wherein the pH is adjusted to a value less than 3 in b).

* * * * *